US012776435B2

(12) United States Patent
Sagara et al.

(10) Patent No.: US 12,776,435 B2
(45) Date of Patent: Oct. 27, 2026

(54) COIL COMPONENT

(71) Applicant: Murata Manufacturing Co., Ltd., Kyoto-fu (JP)

(72) Inventors: Takuma Sagara, Nagaokakyo (JP); Katsuyuki Takahashi, Nagaokakyo (JP); Shingo Nakamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 591 days.

(21) Appl. No.: 18/475,151

(22) Filed: Sep. 26, 2023

(65) Prior Publication Data

US 2024/0112847 A1 Apr. 4, 2024

(30) Foreign Application Priority Data

Sep. 29, 2022 (JP) ................................ 2022-157006

(51) Int. Cl.
*H01F 27/24* (2006.01)
*H01F 27/29* (2006.01)

(52) U.S. Cl.
CPC ............ *H01F 27/24* (2013.01); *H01F 27/29* (2013.01)

(58) Field of Classification Search
CPC ................................ H01F 27/24; H01F 27/29
See application file for complete search history.

(56) References Cited

U.S. PATENT DOCUMENTS

2015/0042436 A1* 2/2015 Arimitsu ............... H01F 27/292 336/192
2017/0316874 A1* 11/2017 Igarashi ................ H01F 27/292
2018/0130597 A1* 5/2018 Komaya ............... H01F 17/045
2018/0261380 A1* 9/2018 Igarashi .............. H01F 27/2828
2018/0330869 A1* 11/2018 Kim .................... H01F 27/2823
(Continued)

FOREIGN PATENT DOCUMENTS

JP 2012-089804 A 5/2012
JP 2013191694 A * 9/2013
(Continued)

OTHER PUBLICATIONS

Japanese Patent Office—Decision to Grant a Patent (Translated) 2025 (Year: 2025).*

*Primary Examiner* — Malcolm Barnes
(74) *Attorney, Agent, or Firm* — Studebaker Brackett PLLC

(57) ABSTRACT

To suppress a decrease in mounting strength of a coil component, a coil component includes a drum core including a winding core portion, and first and second flange portions. The coil component includes a first metal terminal which includes a bonding portion, a connecting portion, and a mounting portion. The bonding portion is bonded to the first flange portion with an adhesive. The mounting portion is closest to the first positive direction side in the first metal terminal and is separated from the first flange portion toward the first positive direction side. The connecting portion connects the bonding and mounting portions. The first flange portion has a facing surface that faces the mounting portion, a bonding surface, and a first inclined surface between the facing and bonding surfaces. The distance from the facing surface increases in a direction parallel to the first axis toward the bonding surface.

9 Claims, 5 Drawing Sheets

(56) References Cited

U.S. PATENT DOCUMENTS

| | | | | |
|---|---|---|---|---|
| 2020/0066435 | A1* | 2/2020 | Igarashi | H01F 17/045 |
| 2021/0065967 | A1* | 3/2021 | Oga | H01F 41/10 |

FOREIGN PATENT DOCUMENTS

| | | | | |
|---|---|---|---|---|
| JP | 2015-035473 | A | | 2/2015 |
| JP | 2017-199840 | A | | 11/2017 |
| JP | 2019-135764 | A | | 8/2019 |
| JP | 2021118272 | A | * | 8/2021 |

* cited by examiner

COIL COMPONENT

CROSS-REFERENCE TO RELATED APPLICATION

This application claims benefit of priority to Japanese Patent Application No. 2022-157006, filed Sep. 29, 2022, the entire content of which is incorporated herein by reference.

BACKGROUND

Technical Field

The present disclosure relates to a coil component.

Background Art

The coil component described in Japanese Patent Application Laid-Open No. 2012-89804 includes a winding core portion and two flange portions. The winding core portion has a quadrangular prism shape. The two flange portions are connected to both ends of the winding core portion. Each flange portion projects outward from the winding core portion in a first positive direction orthogonal to a central axis of the winding core portion. The winding core portion and the flange portion constitute a core of the coil component.

The coil component includes a plurality of metal terminals and two wires. Each metal terminal has a mounting portion. The mounting portion is located closest to the first positive direction side among the metal terminals. This mounting portion is a portion that comes into contact with a substrate when the coil component is mounted on the substrate or the like. The mounting portion is joined to a surface of the flange portion facing the first positive direction with an adhesive interposed therebetween.

SUMMARY

The coil component as described in Japanese Patent Application Laid-Open No. 2012-89804 is mounted on a substrate or the like. At this time, the mounting portion of the metal terminal is joined to the substrate or the like with a solder interposed therebetween. Here, since the thermal expansion coefficient of the coil component is different from the thermal expansion coefficient of the substrate or the like, there is a difference in the degree of thermal deformation between the coil component and the substrate. Therefore, as the temperature changes, a force acts on the solder interposed between the mounting portion of the metal terminal and the substrate or the like. As a result, a crack or the like may occur in the solder between the mounting portion of the metal terminal and the substrate or the like.

Although the example in which the mounting portion of the metal terminal is joined to the substrate or the like with the solder interposed therebetween has been described above, the same problem occurs regardless of the joining mode as long as the mounting portion is joined to the substrate or the like.

Accordingly, the present disclosure provides a coil component including: a drum core including a winding core portion having a columnar shape, a first flange portion connected to a first end in a direction parallel to a central axis of the winding core portion, and a second flange portion connected to a second end of the winding core portion on a side opposite to the first end; a first metal terminal attached to the first flange portion; and a wire wound around the winding core portion and having a first wire end joined to the first metal terminal. When a specific axis orthogonal to the central axis is defined as a first axis, and one of directions parallel to the first axis is defined as a first positive direction, the first flange portion projects outward with respect to the winding core portion in the first positive direction. the first metal terminal includes a bonding portion that adheres to the first flange portion with an adhesive interposed therebetween; a mounting portion located closest to the first positive direction side in the first metal terminal and separated from the first flange portion toward the first positive direction side; and a connecting portion connecting the bonding portion and the mounting portion. The first flange portion includes a facing surface facing the mounting portion and a bonding surface to which the bonding portion is bonded. The first flange portion has an inclined surface between the facing surface and the bonding surface, with the inclined surface having a larger distance from the facing surface in a direction parallel to the first axis toward the bonding surface.

According to the above configuration, due to the presence of the inclined surface, the adhesive existing between the bonding portion of the first metal terminal and the bonding surface of the first flange portion hardly reaches between the mounting portion of the first metal terminal and the facing surface of the first flange portion. That is, it is possible to reliably form a gap between the mounting portion of the first metal terminal and the facing surface of the first flange portion. As a result, if a difference in the degree of thermal deformation occurs between the coil component and the substrate or the like in a state where the coil component is mounted on the substrate or the like, the difference can be absorbed by elastic deformation of the mounting portion and the connecting portion.

Even if there is a difference in the degree of thermal deformation between the coil component and the substrate or the like, the difference can be absorbed by elastic deformation of the mounting portion and the connecting portion.

DETAILED DESCRIPTION

Hereinafter, an embodiment of a coil component will be described. The drawings may show enlarged components to facilitate understanding. The dimensional ratios of the components may be different from the actual ones or those in another drawing.

<Overall Configuration>

Figure 1:
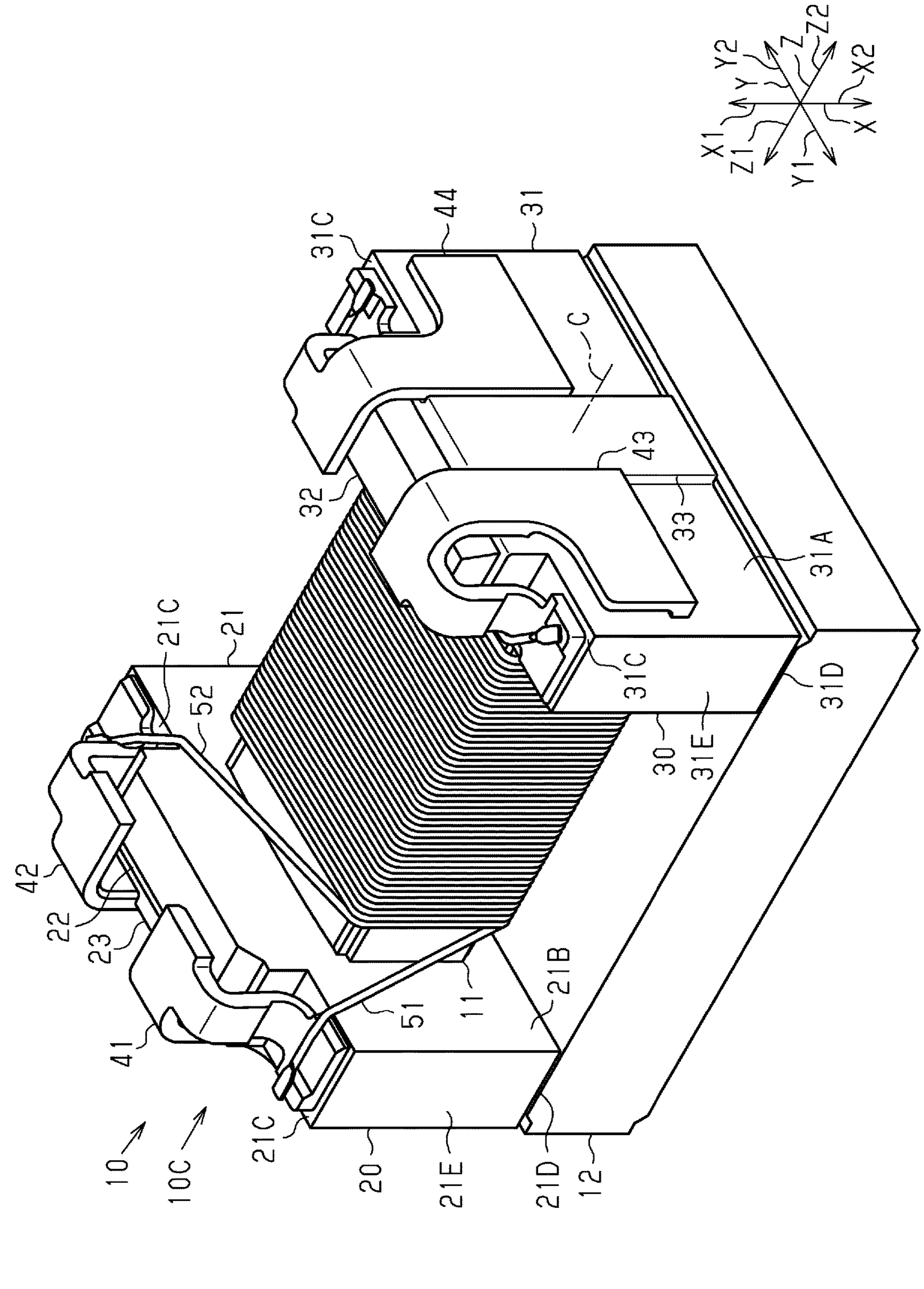
FIG. 1 is a perspective view of a coil component.

As illustrated in FIG. 1, a coil component 10 includes a drum core 10C and a top plate 12.

The drum core 10C includes a winding core portion 11, a first flange portion 20, and a second flange portion 30.

The winding core portion 11 has a quadrangular prism shape. The material of the winding core portion 11 is a non-conductive material. Specifically, the material of the winding core portion 11 can be, for example, alumina, Ni—Zn-based ferrite, resin, a mixture thereof, or the like.

The first flange portion 20 is connected to a first end of the winding core portion 11 in a direction parallel to a central axis C. The second flange portion 30 is connected to a second end of the winding core portion 11 on the side opposite to the first end in the direction parallel to the central axis C. The material of the first flange portion 20 and the second flange portion 30 is the same non-conductive material as the winding core portion 11. The first flange portion 20 and the second flange portion 30 are integrally molded with the winding core portion 11.

Here, a specific axis orthogonal to the central axis C is defined as a first axis X. In the present embodiment, the first axis X is parallel to two of the four sides of the winding core portion 11 when viewed in the direction parallel to the central axis C. An axis orthogonal to the central axis C and the first axis X is defined as a second axis Y. Further, in the present embodiment, an axis parallel to the central axis C is defined as a third axis Z. One of the directions parallel to the first axis X is defined as a first positive direction X1, and a direction opposite to the first positive direction X1 is defined as a first negative direction X2. Similarly, one of the directions parallel to the second axis Y is defined as a second positive direction Y1, and a direction opposite to the second positive direction Y1 is defined as a second negative direction Y2. One of the directions parallel to the third axis Z is defined as a third positive direction Z1, and a direction opposite to the third positive direction Z1 is defined as a third negative direction Z2. In the present embodiment, a direction from the winding core portion 11 toward the first flange portion 20 is defined as a third positive direction Z1, and a direction from the winding core portion 11 toward the second flange portion 30 is defined as a third negative direction Z2.

The first flange portion 20 projects outward with respect to the winding core portion 11 in the direction parallel to the first axis X and the direction parallel to the second axis Y. The first flange portion 20 has a symmetrical shape in the direction along the second axis Y.

Figure 2:
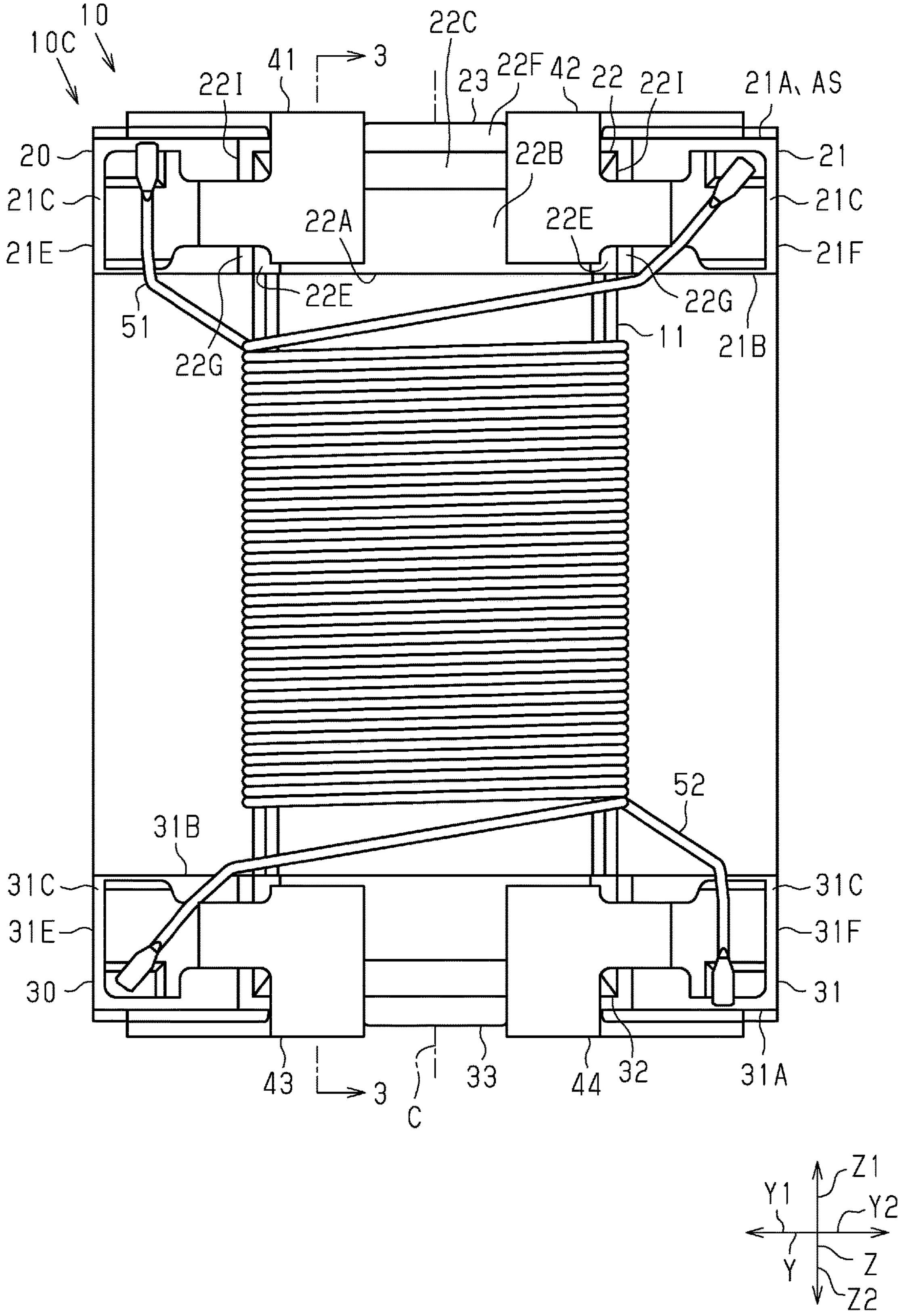
FIG. 2 is a plan view of the coil component.

The first flange portion 20 includes a main body portion 21, a bottom-surface-side protruding portion 22, and an end-surface-side protruding portion 23. The main body portion 21 has a substantially quadrangular prism shape that is flat in the direction parallel to the third axis Z. Here, among the directions parallel to the central axis C, a direction from the first flange portion 20 toward the winding core portion 11 is defined as an inward direction, and a direction from the winding core portion 11 toward the first flange portion 20 is defined as an outward direction. As illustrated in FIG. 2, a surface of the outer surface of the main body portion 21 facing the outward direction is defined as an outer end surface 21A, and a surface of the outer surface of the main body portion 21 facing the inward direction is defined as an inner end surface 21B. Further, as shown in FIG. 1, a surface of the outer surface of the main body portion 21 facing the first positive direction X1 is referred to as a bottom surface 21C, and a surface of the outer surface of the main body portion 21 facing the first negative direction X2 is referred to as a top surface 21D. As illustrated in FIG. 2, a surface of the outer surface of the main body portion 21 facing the second positive direction Y1 is referred to as a first side surface 21E, and a surface of the main body portion 21 located in the second negative direction Y2 is referred to as a second side surface 21F.

As illustrated in FIG. 1, the winding core portion 11 is connected to the inner end surface 21B. That is, the outer end surface 21A is a surface of the main body portion 21 opposite to the surface connected to the winding core portion 11.

The bottom-surface-side protruding portion 22 protrudes from the bottom surface 21C of the main body portion 21 toward the first positive direction X1 side. The bottom-surface-side protruding portion 22 is located at the center of the main body portion 21 in the direction parallel to the second axis Y. The bottom-surface-side protruding portion 22 and the main body portion 21 are integrally molded. That is, there is no clear boundary between the bottom-surface-side protruding portion 22 and the main body portion 21. The shape of the bottom-surface-side protruding portion 22 will be described later in detail.

As illustrated in FIG. 2, the end-surface-side protruding portion 23 protrudes toward the outward direction side from the outer end surface 21A of the main body portion 21. The end-surface-side protruding portion 23 is located at the center of the main body portion 21 in the direction parallel to the second axis Y. The end-surface-side protruding portion 23 extends over the entire main body portion 21 in the direction parallel to the first axis X. The end-surface-side protruding portion 23 also protrudes from the bottom-surface-side protruding portion 22. That is, the end-surface-side protruding portion 23 extends over a part of the bottom-surface-side protruding portion 22 on the first negative direction X2 side in the direction parallel to the first axis X. The end-surface-side protruding portion 23, the main body portion 21, and the bottom-surface-side protruding portion 22 are integrally molded. That is, there is no clear boundary between the end-surface-side protruding portion 23 and the main body portion 21 and between the end-surface-side protruding portion 23 and the bottom-surface-side protruding portion 22. The shape of the end-surface-side protruding portion 23 will be described later in detail.

The second flange portion 30 has a symmetrical shape with the first flange portion 20 in the direction parallel to the third axis Z. That is, the second flange portion 30 projects outward with respect to the winding core portion 11 in the direction parallel to the first axis X and the direction parallel to the second axis Y. The second flange portion 30 includes a main body portion 31, a bottom-surface-side protruding portion 32, and an end-surface-side protruding portion 33.

Here, among the directions parallel to the central axis C, a direction from the second flange portion 30 toward the winding core portion 11 is defined as an inward direction, and a direction from the winding core portion 11 toward the second flange portion 30 is defined as an outward direction. That is, when the second flange portion 30 is used as a reference, the inward direction and the outward direction are opposite to those when the first flange portion 20 is used as a reference.

As illustrated in FIG. 2, a surface of the main body portion 31 facing the outward direction side is defined as an outer end surface 31A, and a surface of the main body portion 31 facing the inward direction side is defined as an inner end surface 31B. As illustrated in FIG. 1, a surface of the main body portion 31 facing the first positive direction X1 side is defined as a bottom surface 31C, and a surface of the main body portion 31 facing the first negative direction X2 side is defined as a top surface 31D. As illustrated in FIG. 2, a surface of the main body portion 31 facing the second positive direction Y1 is referred to as a first side surface 31E, and a surface of the main body portion 31 facing the second negative direction Y2 is referred to as a second side surface 31F.

The bottom-surface-side protruding portion 32 protrudes from the bottom surface 31C of the main body portion 31 toward the first positive direction X1 side. The shape and arrangement of the bottom-surface-side protruding portion 32 of the second flange portion 30 are the same as the shape and arrangement of the bottom-surface-side protruding portion 22 of the first flange portion 20.

The end-surface-side protruding portion 33 protrudes toward the outward direction side from the outer end surface 31A of the main body portion 31. The shape and arrangement of the end-surface-side protruding portion 33 of the second flange portion 30 are the same as the shape and arrangement of the end-surface-side protruding portion 23 of the first flange portion 20.

In the present embodiment, the maximum dimension of the drum core 10C in the direction parallel to the first axis X is 2.3 mm. The maximum dimension of the drum core 10C in the direction parallel to the second axis Y is 2.6 mm. The maximum dimension of the drum core 10C in the direction parallel to the third axis Z is 3.5 mm.

As illustrated in FIG. 1, the top plate 12 has a rectangular plate shape. The top plate 12 is flat in the direction parallel to the first axis X. The long side of the top plate 12 is parallel to the third axis Z. The short side of the top plate 12 is parallel to the second axis Y. The top plate 12 is located on the first negative direction X2 side with respect to the drum core 10C. The top plate 12 is connected to both the top surface 21D of the main body portion 21 of the first flange portion 20 and the top surface 31D of the main body portion 31 of the second flange portion 30. That is, the top plate 12 is bridged between the first flange portion 20 and the second flange portion 30. The material of the top plate 12 is the same non-conductive material as that of the drum core 10C.

The coil component 10 includes a first metal terminal 41, a second metal terminal 42, a third metal terminal 43, and a fourth metal terminal 44.

The first metal terminal 41 is attached to the first flange portion 20. The first metal terminal 41 is located on the second positive direction Y1 side with respect to the end-surface-side protruding portion 23. The second metal terminal 42 is attached to the first flange portion 20. The second metal terminal 42 is located on the second negative direction Y2 side with respect to the end-surface-side protruding portion 23. The third metal terminal 43 is attached to the second flange portion 30. The third metal terminal 43 is located on the second positive direction Y1 side with respect to the end-surface-side protruding portion 33. The fourth metal terminal 44 is attached to the second flange portion 30. The fourth metal terminal 44 is located on the second negative direction Y2 side with respect to the end-surface-side protruding portion 33. The shapes of the first metal terminal 41 to the fourth metal terminal 44 will be described later in detail.

As illustrated in FIG. 2, the coil component 10 includes a first wire 51 and a second wire 52. Although not illustrated, the first wire 51 includes a copper wire and an insulating film. The insulating film covers the outer surface of the copper wire. The first wire 51 has a substantially circular shape in a section orthogonal to the direction in which the first wire 51 extends.

A first wire end of the first wire 51 is joined to the first metal terminal 41 by thermocompression bonding. The first wire 51 extends from the first metal terminal 41 toward the ridgeline of the winding core portion 11 on the first negative direction X2 side and the second positive direction Y1 side. When viewed in the third negative direction Z2, the first wire 51 is wound around the winding core portion 11 so as to travel clockwise as it goes toward the third negative direction Z2. The first wire 51 extends toward the third metal terminal 43 from the ridgeline of the winding core portion 11 on the first positive direction X1 side and the second negative direction Y2 side in the vicinity of the second flange portion 30. A second wire end of the first wire 51 is joined to the third metal terminal 43 by thermocompression bonding.

The second wire 52 has the same configuration as the first wire 51. That is, the second wire 52 includes a copper wire and an insulating film.

A first wire end of the second wire 52 is joined to the second metal terminal 42 by thermocompression bonding. The second wire 52 extends from the second metal terminal 42 toward the ridgeline of the winding core portion 11 on the first positive direction X1 side and the second positive direction Y1 side. When viewed in the third negative direction Z2, the second wire 52 is wound around the winding core portion 11 so as to travel clockwise as it goes toward the third negative direction Z2. The second wire 52 extends toward the fourth metal terminal 44 from the ridgeline of the winding core portion 11 on the first negative direction X2 side and the second negative direction Y2 side in the vicinity of the second flange portion 30. A second wire end of the second wire 52 is joined to the fourth metal terminal 44 by thermocompression bonding.

<Bottom-Surface-Side Protruding Portion>

Hereinafter, the bottom-surface-side protruding portion 22 of the first flange portion 20 will be described as a representative. The bottom-surface-side protruding portion 32 on the second flange portion 30 side has a symmetrical shape in the direction parallel to the third axis Z with respect to the bottom-surface-side protruding portion 22 of the first flange portion 20. The bottom-surface-side protruding portion 22 is a second protruding portion that protrudes toward the first positive direction X1 side from the bottom surface 21C that is a surface of the first flange portion 20 facing the first positive direction X1.

As described above, the bottom-surface-side protruding portion 22 protrudes from the bottom surface 21C of the main body portion 21 toward the first positive direction X1 side. The bottom-surface-side protruding portion 22 is located substantially at the center of the main body portion 21 in the direction parallel to the second axis Y.

As illustrated in FIG. 1, the bottom-surface-side protruding portion 22 has a substantially quadrangular prism shape. Of the protruding distal end side edges of the bottom-surface-side protruding portion 22, edges on the second positive direction Y1 side, the second negative direction Y2 side, and the third positive direction Z1 side edges are C-chamfered. As a result, the bottom-surface-side protruding portion 22 has a shape in which a distal end portion having a substantially quadrangular pyramid shape protrudes from a base end portion having a quadrangular prism shape.

Figure 3:
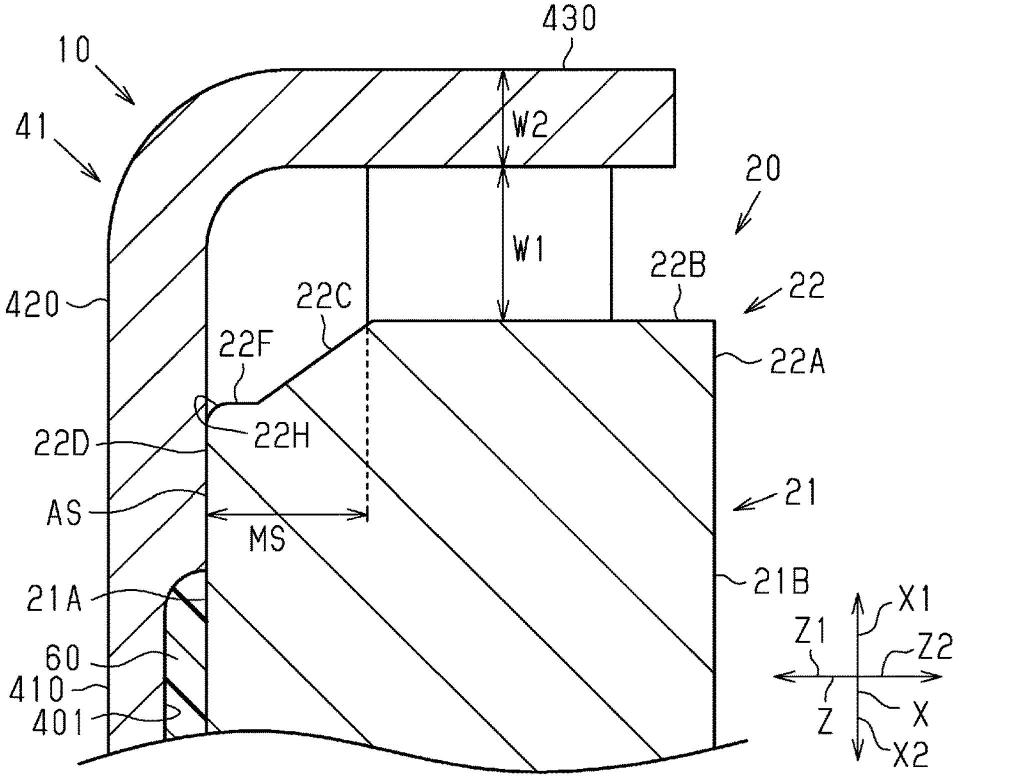
FIG. 3 is an enlarged sectional view of a part taken along line 3-3 in FIG. 2.

As illustrated in FIGS. 2 and 3, the bottom-surface-side protruding portion 22 has an inner end surface 22A, a facing surface 22B, a first inclined surface 22C, and an outer end surface 22D. The bottom-surface-side protruding portion 22 has two second inclined surfaces 22E, a first flat surface 22F, two second flat surfaces 22G, a chamfered surface 22H, and two side end surfaces 22I.

As illustrated in FIG. 3, the inner end surface 22A is a surface of the bottom-surface-side protruding portion 22 facing the third negative direction Z2. Therefore, the inner end surface 22A is orthogonal to the third axis Z. The inner end surface 22A is flush with the inner end surface 21B of the main body portion 21.

The facing surface 22B is a surface of the bottom-surface-side protruding portion 22 facing the first positive direction X1 side. That is, the facing surface 22B is a top surface of the bottom-surface-side protruding portion 22. The facing surface 22B is located closest to the first positive direction X1 side in the first flange portion 20. The facing surface 22B is adjacent to the inner end surface 22A on the first positive direction X1 side. The facing surface 22B is orthogonal to the first axis X. The facing surface 22B faces a mounting portion 430 of the first metal terminal 41 described later.

The first inclined surface 22C is a surface facing the third positive direction Z1 side and the first positive direction X1 side in the bottom-surface-side protruding portion 22. The first inclined surface 22C is adjacent to the facing surface 22B on the third positive direction Z1 side. In the present embodiment, the first inclined surface 22C has a planar shape. The first inclined surface 22C has a larger distance from the facing surface 22B in the direction parallel to the first axis X toward the third positive direction Z1 side.

In the present embodiment, the inclination angle of the first inclined surface 22C is about 45 degrees. The average inclination angle of the first inclined surface 22C is also about 45 degrees. Note that the inclination angle here is an angle on the acute angle side among angles formed by a virtual plane including the facing surface 22B and a virtual plane including the first inclined surface 22C. The average inclination angle referred to herein is defined as follows. That is, the inclination angle with respect to the virtual plane parallel to the facing surface 22B at the edge of the first inclined surface 22C closest to the third positive direction Z1 side is calculated. In addition, the inclination angle with respect to the virtual plane parallel to the facing surface 22B at the edge of the first inclined surface 22C closest to the third negative direction Z2 side is calculated. Further, the inclination angle with respect to the virtual plane parallel to the facing surface 22B at the center of the first inclined surface 22C in the direction along the third axis Z is calculated. An average of these three inclination angles is defined as an average inclination angle. In the following description, the inclination angle and the average inclination angle are similarly calculated.

The first flat surface 22F is adjacent to the first inclined surface 22C on the third positive direction Z1 side. The first flat surface 22F has a planar shape. In the present embodiment, the inclination angle of the first flat surface 22F is 0 degrees. Therefore, the inclination angle of the first flat surface 22F is smaller than the average inclination angle of the first inclined surface 22C.

The chamfered surface 22H is adjacent to the first flat surface 22F on the third positive direction Z1 side. In the present embodiment, the chamfered surface 22H is a curved surface protruding toward the third positive direction Z1 side and the first positive direction X1 side. The average inclination angle of the chamfered surface 22H is about 45 degrees. That is, the average inclination angle of the chamfered surface 22H is larger than the inclination angle of the first flat surface 22F.

The outer end surface 22D is adjacent to the chamfered surface 22H on the first negative direction X2 side. The outer end surface 22D is a surface of the bottom-surface-side protruding portion 22 facing the third positive direction Z1. Therefore, the outer end surface 22D is orthogonal to the third axis Z. The outer end surface 22D is flush with the outer end surface 21A of the main body portion 21. The outer end surface 22D is a bonding surface AS to which a bonding portion 410 of the first metal terminal 41 described later is bonded together with the outer end surface 21A of the main body portion 21.

Figure 4:
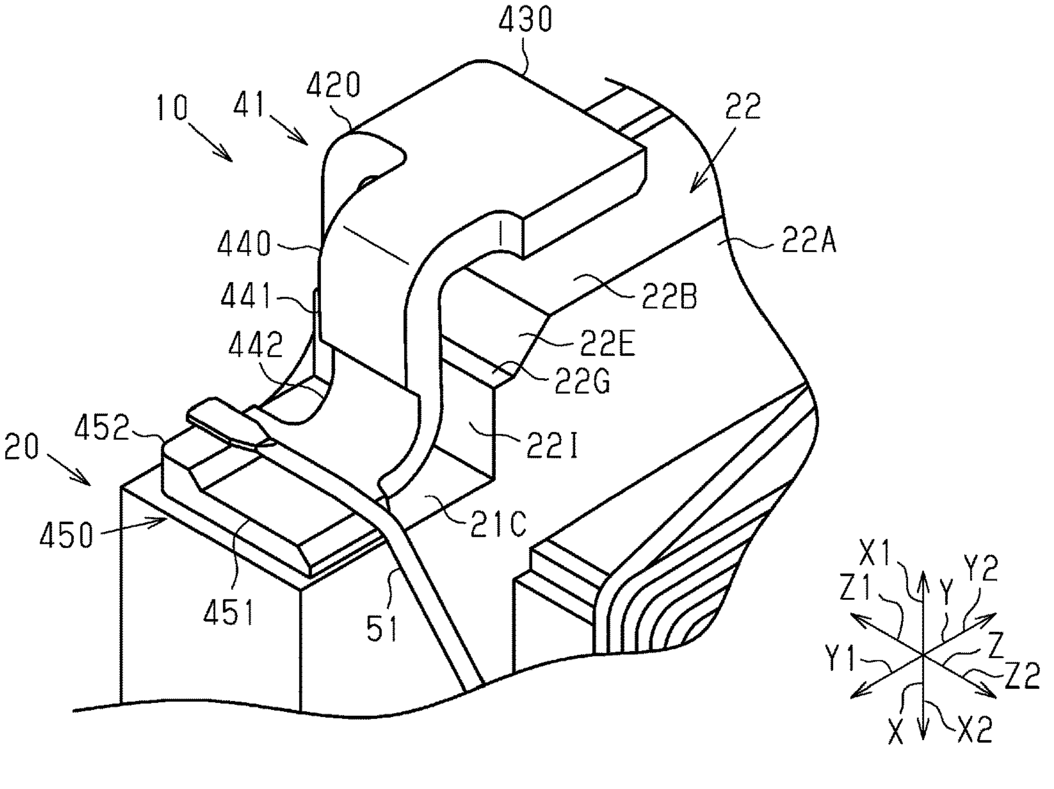
FIG. 4 is an enlarged perspective view of the vicinity of a first metal terminal.

As illustrated in FIG. 4, one of the two second inclined surfaces 22E, one of the two second flat surfaces 22G, and one of the two side end surfaces 22I are located on the second positive direction Y1 side with respect to the facing surface 22B. Hereinafter, the second inclined surface 22E, the second flat surface 22G, and the side end surface 22I on the second positive direction Y1 side will be described.

The second inclined surface 22E is a surface facing the second positive direction Y1 side and the first positive direction X1 side. The second inclined surface 22E is adjacent to the facing surface 22B on the third negative direction Z2 side. The second inclined surface 22E is adjacent to the first inclined surface 22C on the second positive direction Y1 side. In the present embodiment, the second inclined surface 22E has a planar shape. The second inclined surface 22E has a larger distance from the facing surface 22B in the direction parallel to the first axis X as the distance from the facing surface 22B increases. The inclination angle of the second inclined surface 22E is about 45 degrees. The average inclination angle of the second inclined surface 22E is also about 45 degrees.

The second flat surface 22G is adjacent to the second inclined surface 22E on the second positive direction Y1 side, that is, on the side opposite to the facing surface 22B. The second flat surface 22G is continuous with the first flat surface 22F. The second flat surface 22G has a planar shape. In the present embodiment, the inclination angle of the second flat surface 22G is 0 degrees. Therefore, the inclination angle of the second flat surface 22G is smaller than the average inclination angle of the second inclined surface 22E.

The side end surface 22I is adjacent to the second flat surface 22G on the first negative direction X2 side. The side end surface 22I is a surface of the bottom-surface-side protruding portion 22 facing the second positive direction Y1 side. Therefore, the side end surface 22I is orthogonal to the second axis Y. The side end surface 22I is connected to the bottom surface 21C of the main body portion 21.

Another one of the two second inclined surfaces 22E, another one of the two second flat surfaces 22G, and another one of the two side end surfaces 22I are located on the second negative direction Y2 side with respect to the facing surface 22B. The shapes of the second inclined surface 22E, the second flat surface 22G, and the side end surface 22I on the second negative direction Y2 side and the shapes of the second inclined surface 22E, the second flat surface 22G, and the side end surface 22I on the second positive direction Y1 side are symmetrical in the direction along the second axis Y.

<End-Surface-Side Protruding Portion>

Hereinafter, the end-surface-side protruding portion 23 of the first flange portion 20 will be described as a representative. The end-surface-side protruding portion 33 on the second flange portion 30 side has a symmetrical shape in the direction parallel to the third axis Z with respect to the end-surface-side protruding portion 23 of the first flange portion 20. The end-surface-side protruding portion 23 is a first protruding portion which protrudes from the outer end surface 21A opposite to the surface of the main body portion 21 connected to the winding core portion 11.

Figure 5:
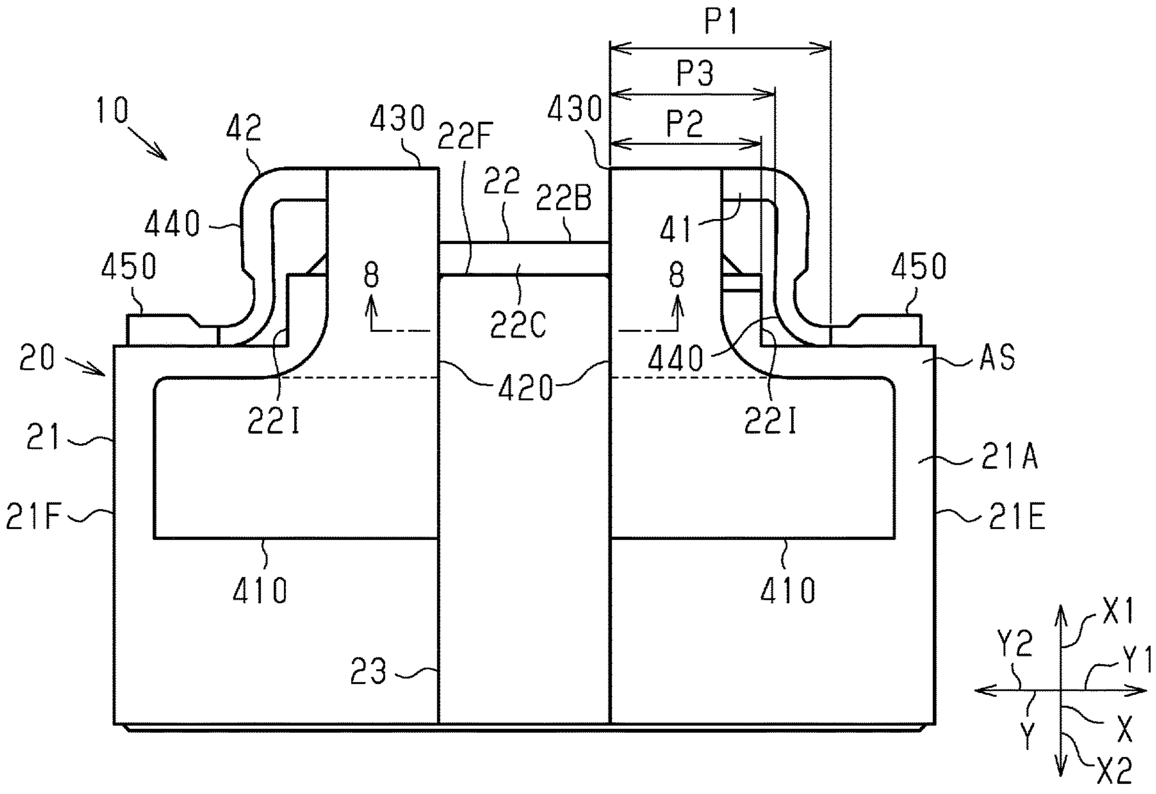
FIG. 5 is a view when a first flange portion is viewed in an inward direction.

As described above, the end-surface-side protruding portion 23 protrudes toward the outward direction side from the outer end surface 21A of the main body portion 21. As illustrated in FIG. 5, the end-surface-side protruding portion 23 extends over the entire main body portion 21 and a part of the bottom-surface-side protruding portion 22 on the first negative direction X2 side in the direction parallel to the first axis X. Specifically, the end-surface-side protruding portion 23 extends from the end of the main body portion 21 on the first negative direction X2 side to the first flat surface 22F of the bottom-surface-side protruding portion 22. That is, the facing surface 22B of the bottom-surface-side protruding portion 22 is located on the first positive direction X1 side with respect to the portion of the end-surface-side protruding portion 23 located closest to the first positive direction X1 side. The end-surface-side protruding portion 23 is located substantially at the center of the main body portion 21 in the direction along the second axis Y. The dimension of the end-surface-side protruding portion 23 in the direction parallel to the second axis Y is smaller than the maximum dimension of the bottom-surface-side protruding portion 22 in the direction parallel to the second axis Y. In FIG. 5, illustration of the top plate 12 is omitted.

Figure 8:
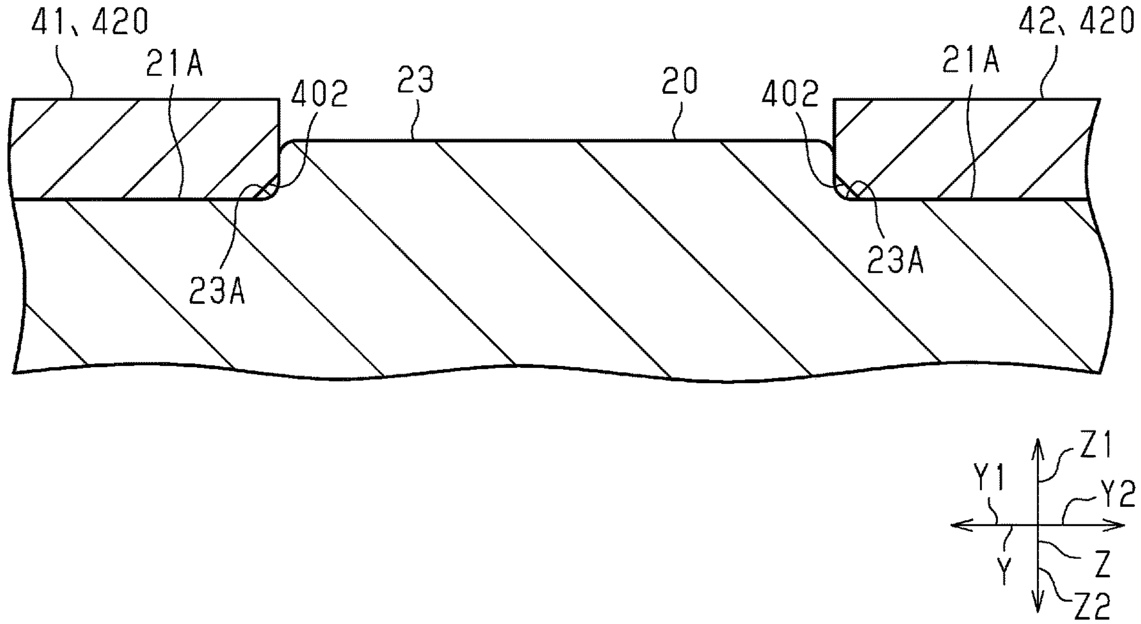
FIG. 8 is an enlarged sectional view of a part taken along line 8-8 in FIG. 5.

As shown in FIG. 8, a boundary portion 23A between the end-surface-side protruding portion 23 and the outer end surface 21A has a chamfered shape. When viewed in the first negative direction X2, the boundary portion 23A between the end-surface-side protruding portion 23 and the outer end surface 21A is a curved surface protruding toward the center side of the end-surface-side protruding portion 23 and toward the third negative direction Z2 side. That is, the chamfered shape is a round chamfered shape.

<First Metal Terminal>

Figure 6:
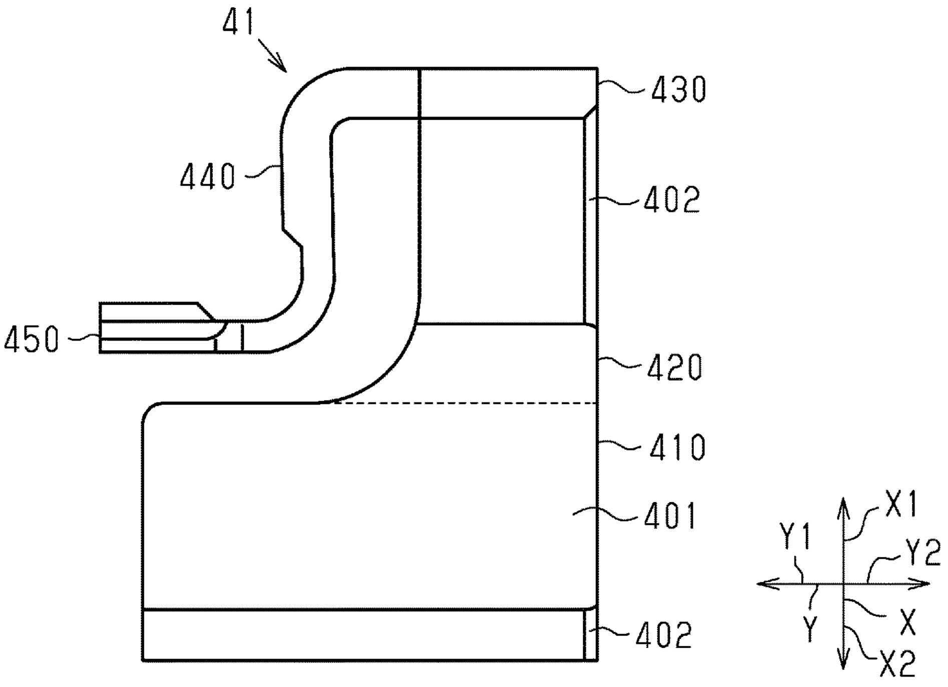
FIG. 6 is a view when the first metal terminal is viewed in an outward direction.

As illustrated in FIG. 6, the first metal terminal 41 has a plate shape. More specifically, the first metal terminal 41 has a plate shape curved at a plurality of positions. The first metal terminal 41 is attached to the first flange portion 20. The first metal terminal 41 includes a bonding portion 410, a connecting portion 420, a mounting portion 430, an extending portion 440, and a joining portion 450. The bonding portion 410, the connecting portion 420, the mounting portion 430, the extending portion 440, and the joining portion 450 are integrally molded. Specifically, the first metal terminal 41 is formed by bending one plate material. That is, there is no clear boundary between these members inside the first metal terminal 41.

As illustrated in FIG. 5, the bonding portion 410 has a substantially rectangular plate shape. As illustrated in FIG. 3, the bonding portion 410 is bonded to the bonding surface AS of the first flange portion 20 with an adhesive 60 interposed therebetween. That is, the bonding portion 410 is bonded to a surface of the outer surface of the first flange portion 20 facing the outward direction. As illustrated in FIG. 5, when viewed in the third negative direction Z2, corners of the bonding portion 410 on the second positive direction Y1 side and the first positive direction X1 side are rounded. On the other hand, corners of the bonding portion 410 on the second positive direction Y1 side and the first negative direction X2 side are substantially right angles. That is, the corner of the bonding portion 410 on the second positive direction Y1 side and the side close to the top surface 21D is located on the second positive direction Y1 side and has a larger curvature than the corner of the bonding portion 410 on the second positive direction Y1 side and the side close to the bottom surface 21C.

The bonding portion 410 is located closer to the first positive direction X1 side of the main body portion 21 of the first flange portion 20. That is, the shortest distance from the edge of the bonding portion 410 on the first positive direction X1 side to the bottom surface 21C of the main body portion 21 is shorter than the shortest distance from the edge of the bonding portion 410 on the first negative direction X2 side to the top surface 21D of the main body portion 21.

The maximum dimension of the bonding portion 410 in the direction parallel to the second axis Y is half or less of the maximum dimension of the first flange portion 20 in the direction parallel to the second axis Y. In the present embodiment, the dimension of the bonding portion 410 in the direction parallel to the second axis Y is half or less of the dimension of the main body portion 21 in the direction parallel to the second axis Y.

The connecting portion 420 is adjacent to the bonding portion 410 on the first positive direction X1 side. Specifically, the connecting portion 420 extends in the first positive direction X1 from the end of the bonding portion 410 in the second negative direction Y2. When viewed in the third negative direction Z2, the connecting portion 420 has a substantially rectangular shape. The dimension of the connecting portion 420 in the direction along the second axis Y is smaller than the dimension of the bonding portion 410 in the direction along the second axis Y. The dimension of the connecting portion 420 in the direction along the second axis Y is substantially constant except for a boundary portion with the bonding portion 410. On the other hand, the edge of the connecting portion 420 on the second negative direction Y2 side extends parallel to the first axis X on the same straight line as the edge of the bonding portion 410 on the second negative direction Y2 side. An end of the connecting portion 420 on the first positive direction X1 side protrudes from the first flange portion 20 toward the first positive direction X1 side when viewed in the direction parallel to the third axis Z. In FIG. 5, the boundary between the connecting portion 420 and the bonding portion 410 is virtually indicated by a broken line.

As illustrated in FIG. 4, a portion of the connecting portion 420 protruding toward the first positive direction X1 side with respect to the first flange portion 20 is curved by about 90 degrees on the way. The curved portion is rounded. An end of the connecting portion 420 on the side opposite to the bonding portion 410 faces the third negative direction Z2.

As illustrated in FIG. 4, the mounting portion 430 is connected to an end of the connecting portion 420 on the side opposite to the bonding portion 410. That is, the connecting portion 420 connects the mounting portion 430 and the bonding portion 410. The mounting portion 430 has a flat plate shape. The main surface of the mounting portion 430 is orthogonal to the first axis X. That is, the main surface of the mounting portion 430 is orthogonal to the main surface of the portion extending along the first axis X in the connecting portion 420. The dimension of the mounting portion 430 in the direction parallel to the second axis Y is the same as the dimension of the connecting portion 420 in the direction parallel to the second axis Y. The edge of the mounting portion 430 on the second negative direction Y2 side is the same straight line as the edge of the connecting portion 420 on the second negative direction Y2 side and extends parallel to the third axis Z.

The mounting portion 430 is a portion of the first metal terminal 41 that is located closest to the first positive direction X1 side. The mounting portion 430 is separated from the facing surface 22B of the first flange portion 20 on the first positive direction X1 side. That is, there is a gap between the mounting portion 430 and the first flange portion 20. The mounting portion 430 and the facing surface 22B face each other. The mounting portion 430 is a portion facing a substrate when the coil component 10 is mounted on the substrate.

As illustrated in FIG. 3, a shortest distance W1 from the mounting portion 430 to the first flange portion 20 in the direction parallel to the first axis X is larger than a minimum dimension W2 of the mounting portion 430 in the direction parallel to first axis X. In addition, the shortest distance W1 from the mounting portion 430 to the first flange portion 20 in the direction parallel to the first axis X is larger than a minimum dimension MS in the direction parallel to the central axis C from the end of the first inclined surface 22C in the inward direction to the outer end surface 21A. The minimum dimension MS in the direction parallel to the central axis C from the end of the first inclined surface 22C in the inward direction to the outer end surface 21A is, for example, 200 μm. In the present embodiment, the dimension of the mounting portion 430 in the direction along the first axis X is the thickness dimension of the mounting portion 430. The thickness dimension indicates the plate thickness of the first metal terminal 41. More specifically, the thickness dimension is the shortest distance from a specific point on the outer surface of the first metal terminal 41 to the outer surface on the side opposite to the outer surface on which the specific point is located. The thickness dimension of the mounting portion 430 is substantially constant.

As illustrated in FIG. 4, the extending portion 440 is connected to an end of the mounting portion 430 on the second positive direction Y1 side. The extending portion 440 extends substantially obliquely from the mounting portion 430 toward the second positive direction Y1 side and the first negative direction X2 side. The dimension of the extending portion 440 in the direction along the third axis Z, that is, the width dimension of the extending portion 440 is substantially constant.

The extending portion 440 includes a first portion 441 and a second portion 442. The first portion 441 is a part of the extending portion 440 on the mounting portion 430 side. The second portion 442 is a part of the extending portion 440 on the side farther from the mounting portion 430. The first portion 441 is also located at a connection portion with the mounting portion 430. The second portion 442 is also located at a connection portion between the extending portion 440 and a joining portion 450 described later. The thickness dimension of the first portion 441 is substantially the same as the thickness dimension of the mounting portion 430. On the other hand, the thickness dimension of the second portion 442 is smaller than the thickness dimension of the first portion 441. Therefore, the second portion 442 is a thin portion having a thickness dimension smaller than the thickness dimension of the mounting portion 430.

The surface of the first portion 441 facing the first flange portion 20 is flush with the surface of the second portion 442 facing the first flange portion 20. On the other hand, the surface of the second portion 442 facing the second positive direction Y1 side is located on the second negative direction Y2 side with respect to the surface of the first portion 441 facing the second positive direction Y1.

The extending portion 440 extends so as to approach the bottom surface 21C of the main body portion 21 in the second positive direction Y1. A gap is formed between the extending portion 440 and the first flange portion 20 in the direction parallel to the second axis Y. Specifically, a gap is formed between the extending portion 440 and the bottom-surface-side protruding portion 22 in the direction parallel to the second axis Y.

The joining portion 450 is connected to an end of the extending portion 440 on the first negative direction X2 side. The joining portion 450 has a substantially plate shape. The joining portion 450 includes a plate body 451 and a joining protrusion 452. The plate body 451 has a substantially rectangular shape elongated in the third axis Z direction when viewed in the direction along the first axis X. The maximum dimension of the plate body 451 in the direction parallel to the third axis Z is larger than the maximum dimension of the extending portion 440 in the direction parallel to the third axis Z. A part of the plate body 451 on the third negative direction Z2 side, which is a surface facing the first positive direction X1 side, is an inclined surface. That is, the thickness dimension of a part of the plate body 451 on the third negative direction Z2 side decreases toward the third negative direction Z2 side. The thickness dimension of the portion of the plate body 451 where the inclined surface is not formed is substantially the same as the thickness dimension of the second portion 442.

As illustrated in FIG. 4, the plate body 451 faces the bottom surface 21C of the main body portion 21 of the first flange portion 20 from the first positive direction X1 side. A surface of the joining portion 450 facing the first negative direction X2 is in contact with the bottom surface 21C. On the other hand, the surface of the plate body 451 facing the first negative direction X2 is not fixed to the bottom surface 21C.

Figure 7:
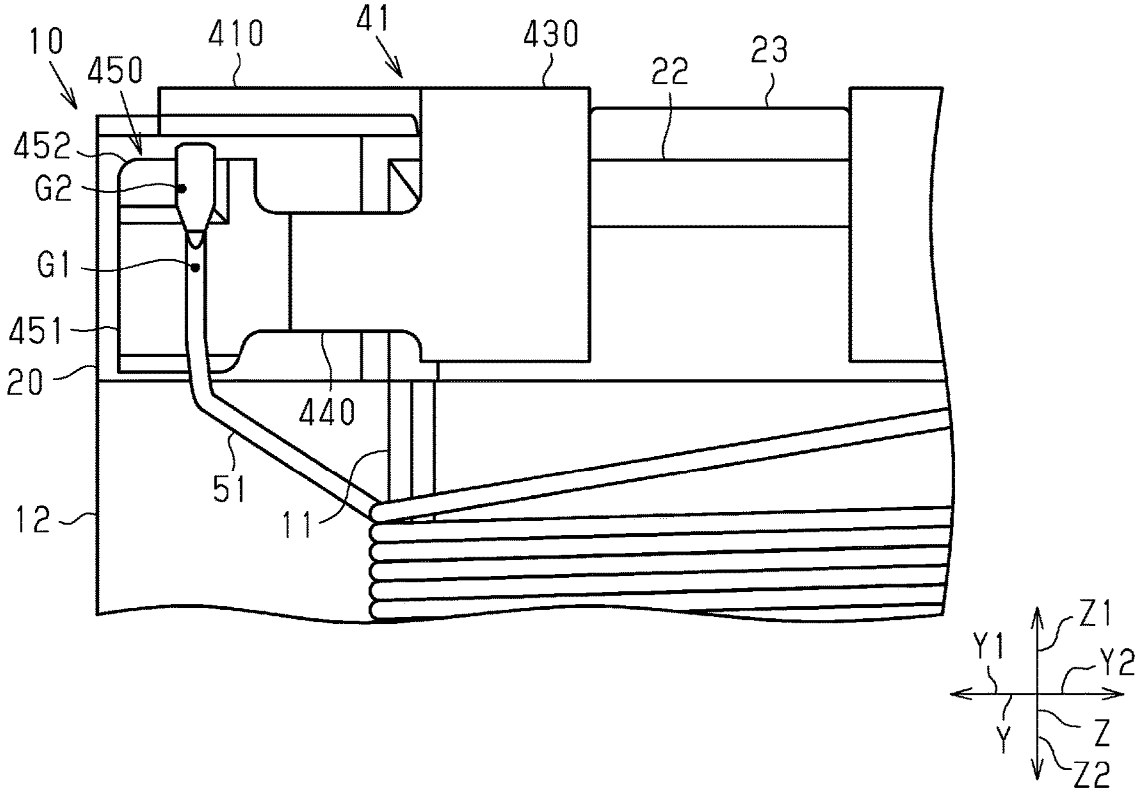
FIG. 7 is a view when the coil component is viewed in a first negative direction.

As illustrated in FIG. 7, the joining protrusion 452 protrudes toward the first positive direction X1 side from a surface of the plate body 451 facing the first positive direction X1. The dimension of the joining protrusion 452 in the direction parallel to the third axis Z decreases toward the first positive direction X1. The dimension of the joining protrusion 452 in the direction parallel to the second axis Y decreases toward the first positive direction X1. That is, the joining protrusion 452 has a substantially quadrangular prism shape. When viewed in the first negative direction X2, the geometric center G2 of the joining protrusion 452 is located on the outward direction side and on the side opposite to the extending portion 440 with respect to the geometric center G1 of the joining portion 450. Specifically, the joining protrusion 452 protrudes from a corner portion of the plate body 451 on the second positive direction Y1 side and the third positive direction Z1 side. The first wire end of the first wire 51 is joined to a surface of the joining protrusion 452 facing the first positive direction X1 side.

<Surface of First Metal Terminal on Third Negative Direction Side>

As illustrated in FIG. 6, the first metal terminal 41 has a recess 401. As illustrated in FIG. 3, the recess 401 is recessed with respect to the surface of the bonding portion 410 facing the third negative direction Z2. The recess 401 is recessed with respect to a surface of the connecting portion 420 facing the third negative direction Z2. That is, as illustrated in FIG. 6, the recess 401 extends over both the bonding portion 410 and the connecting portion 420. The recess 401 extends over the entire area of the bonding portion 410 in the direction parallel to the second axis Y. As illustrated in FIG. 3, the end of the recess 401 on the first positive direction X1 side is located on the first negative direction X2 side with respect to the end of the bonding surface AS on the first positive direction X1 side. As illustrated in FIG. 6, the end of the recess 401 on the first negative direction X2 side is located on the first positive direction X1 side with respect to the end of the bonding portion 410 in the first negative direction X2. The adhesive 60 is accommodated in the recess 401. The adhesive 60 may protrude from the recess 401.

As illustrated in FIG. 6, in the first metal terminal 41, a center-side end edge 402 which is an edge on the second negative direction Y2 side and the side close to the first flange portion 20 has a chamfered shape. Specifically, on the surface of the first metal terminal 41 facing the first flange portion 20 side, the edge on the second negative direction Y2 side has a chamfered shape except for the recess 401. The center-side end edge 402 has a shape in which a corner is obliquely cut. That is, the center-side end edge 402 is so-called C-chamfered. Here, the chamfering dimension is defined as follows. That is, in the case of C chamfering, the chamfering dimension is $1/\sqrt{2}$ times the dimension of the chamfered oblique side. In the case of round chamfering, the chamfering dimension is a radius of the chamfered shape.

<Second Metal Terminal to Fourth Metal Terminal>

As illustrated in FIG. 1, the second metal terminal 42 has a shape inverted in the direction along the second axis Y with respect to the first metal terminal 41. The third metal terminal 43 has the same shape as the second metal terminal 42. The fourth metal terminal 44 has the same shape as the first metal terminal 41. That is, the second metal terminal 42 to the fourth metal terminal 44 have the same configuration as the bonding portion 410, the connecting portion 420, the mounting portion 430, the extending portion 440, and the joining portion 450 described above.

<Positional Relationship Between First Metal Terminal and End-Surface-Side Protruding Portion>

As described above, a gap is formed between the extending portion 440 and the first flange portion 20 in the direction parallel to the second axis Y. Specifically, a gap is formed between the extending portion 440 and the bottom-surface-side protruding portion 22. In addition, a gap is formed between the joining portion 450 and the first flange portion 20 in the direction parallel to the second axis Y. Specifically, a gap is formed between the joining portion 450 and the bottom-surface-side protruding portion 22.

As shown in FIG. 5, when viewed in the third negative direction Z2, the edge of the first metal terminal 41 on the second negative direction Y2 side is in surface contact with the end-surface-side protruding portion 23. Specifically, as shown in FIG. 8, the surface of the end-surface-side protruding portion 23 on the second positive direction Y1 side and the surface of the first metal terminal 41 on the second negative direction Y2 side are in contact with each other. As described above, the first metal terminal 41 has the center-side end edge 402. The chamfering dimension of the center-side end edge 402 is larger than the chamfering dimension of the boundary portion 23A between the end-surface-side protruding portion 23 and the outer end surface 21A. Therefore, the center-side end edge 402 of the first metal terminal 41 and the boundary portion 23A of the end-surface-side protruding portion 23 are not in contact with each other.

In the first metal terminal 41, the shortest distance from the end of the end-surface-side protruding portion 23 on the second positive direction Y1 side to the joining portion 450 in the direction parallel to the second axis Y is defined as a first distance P1. In the direction parallel to the second axis Y, the maximum distance from the end of the end-surface-side protruding portion 23 on the second positive direction Y1 side to the end of the bottom-surface-side protruding portion 22 on the second positive direction Y1 side, that is, the side end surface 22I is defined as a second distance P2. The first distance P1 is larger than the second distance P2.

In the first metal terminal 41, the shortest distance from the end of the end-surface-side protruding portion 23 on the second positive direction Y1 side to the extending portion 440 in the direction parallel to the second axis Y is defined as a third distance P3. The third distance P3 is larger than the second distance P2.

The positional relationship between the second metal terminal 42 and the end-surface-side protruding portion 23 is the same as the positional relationship between the first metal terminal 41 and the end-surface-side protruding portion 23. The positional relationship between the third metal terminal 43 and the end-surface-side protruding portion 33 and the positional relationship between the fourth metal terminal 44 and the end-surface-side protruding portion 33 are also similar to the positional relationship between the first metal terminal 41 and the end-surface-side protruding portion 23.

As shown in FIG. 8, when viewed in the first negative direction X2, the portion of the bonding portion 410 of the first metal terminal 41 on the outermost direction side is located on the outer direction side with respect to the portion of the end-surface-side protruding portion 23 on the outermost direction side.

<Adhesive>

As illustrated in FIG. 3, the adhesive 60 is accommodated in the recess 401. The adhesive 60 may protrude from the recess 401 toward the first positive direction X1 side along the connecting portion 420 due to a capillary phenomenon. The adhesive 60 protruding from the recess 401 may reach the chamfered surface 22H.

Here, a plurality of coil components 10 having different dimensions in the direction parallel to the central axis C from the end of the first inclined surface 22C in the inward direction to the bonding surface AS were prepared, and it was confirmed whether the adhesive 60 reached the facing surface 22B. As a result, when the minimum dimension MS in the direction parallel to the central axis C from the end in the inward direction of the first inclined surface 22C to the bonding surface AS was 100 μm or more, the adhesive 60 did not reach the facing surface 22B in all the coil components 10.

<Effects of Present Embodiment>

Hereinafter, effects common to the first metal terminal 41 to the fourth metal terminal 44 will be described only for the first metal terminal 41 as a representative. An effect common to the first flange portion 20 and the second flange portion 30 will be described only for the first flange portion 20.

(1) In the above embodiment, the first inclined surface 22C exists between the facing surface 22B and the bonding surface AS. The first inclined surface 22C has a larger distance from the facing surface 22B in the direction parallel to the first axis X toward the bonding surface AS. According to this configuration, due to the presence of the first inclined surface 22C, the adhesive 60 existing between the bonding portion 410 of the first metal terminal 41 and the bonding surface AS of the first flange portion 20 hardly reaches between the mounting portion 430 of the first metal terminal 41 and the facing surface 22B of the first flange portion 20. That is, it is possible to reliably form a gap between the mounting portion 430 of the first metal terminal 41 and the facing surface 22B of the first flange portion 20. As a result, if a difference in the degree of thermal deformation occurs between the coil component 10 and the substrate or the like in a state where the coil component 10 is mounted on the substrate or the like, the difference can be absorbed by elastic deformation of the mounting portion 430 and the connecting portion 420.

(2) In the above embodiment, the bonding portion 410 is bonded to a surface of the outer surface of the first flange portion 20 facing the outward direction. Specifically, the bonding portion 410 is bonded to the bonding surface AS including the outer end surface 21A of the first flange portion 20. According to this configuration, since the outer end surface 21A and the facing surface 22B are orthogonal to each other, the adhesive 60 hardly reaches between the facing surface 22B and the mounting portion 430.

(3) In the above embodiment, the first flange portion 20 has the first flat surface 22F between the bonding surface AS and the first inclined surface 22C. Due to the presence of the first flat surface 22F, the first inclined surface 22C and the facing surface 22B are away from the bonding surface AS in the inward direction. Therefore, it is possible to more effectively prevent the adhesive 60 from reaching the facing surface 22B. Further, in the above configuration, as compared with the configuration including only the first inclined surface 22C, for example, when the drum core 10C is formed with a mold or the like, it is possible to suppress the deformation of the first inclined surface 22C or the like.

(4) In the above embodiment, the first flange portion 20 has the chamfered surface 22H between the bonding surface AS and the first flat surface 22F. The average inclination angle of the chamfered surface 22H is larger than the inclination angle of the first flat surface 22F. According to this, the adhesive 60 can be accumulated in the space between the chamfered surface 22H and the bonding surface AS. Therefore, if the adhesive 60 protrudes from the recess 401 toward the first positive direction X1 side due to the capillary phenomenon, the adhesive 60 stays in the space between the chamfered surface 22H and the bonding surface AS, and hardly reaches the facing surface 22B.

(5) In the above embodiment, the shortest distance W1 from the mounting portion 430 to the facing surface 22B of the first flange portion 20 in the direction parallel to the first axis X is larger than the minimum dimension W2 of the mounting portion 430 in the direction along the first axis X. According to this configuration, the mounting portion 430 is correspondingly separated from the facing surface 22B of the first flange portion 20. Therefore, it is possible to suppress adhesion of the adhesive 60 between the mounting portion 430 and the facing surface 22B.

(6) In the above embodiment, the shortest distance W1 from the mounting portion 430 to the facing surface 22B in the direction parallel to the first axis X is larger than the minimum dimension MS in the direction parallel to the central axis C from the end of the first inclined surface 22C in the inward direction to the bonding surface AS. According to this configuration, the mounting portion 430 is correspondingly separated from the facing surface 22B of the first flange portion 20. Therefore, it is possible to suppress adhesion of the adhesive 60 between the mounting portion 430 and the facing surface 22B.

(7) In the above embodiment, the minimum dimension MS in the direction parallel to the central axis C from the end of the first inclined surface 22C in the inward direction to the bonding surface AS is about 200 μm. As described above, when the minimum dimension MS is 100 μm or more, there is a low possibility that the adhesive 60 reaches the facing surface 22B. Therefore, the mounting portion 430 and the facing surface 22B are hardly adhered to each other.

(8) In the above embodiment, the first flange portion 20 has the second inclined surface 22E. The second inclined surface 22E is inclined such that the distance from the facing surface 22B increases in the direction parallel to the first axis X as the distance from the facing surface 22B increases. Therefore, the adhesive 60 hardly goes around from the direction along the second axis Y of the bottom-surface-side protruding portion 22 and reaches the mounting portion 430.

(9) In the above embodiment, the first flange portion 20 has the second flat surface 22G. The inclination angle of the second flat surface 22G is smaller than the average inclination angle of the second inclined surface 22E. According to this, the same effect as (3) can be obtained in the direction parallel to the second axis Y.

Modifications

The present embodiment can be modified and implemented as follows. The present embodiment and the following modifications can be implemented in combination with each other within a range not technically contradictory. A modification common to the first metal terminal 41 to the fourth metal terminal 44 will be described only for the first metal terminal 41 as a representative. Further, a modification common to the first flange portion 20 and the second flange portion 30 will be described only for the first flange portion 20.

In the above embodiment, the configuration of the coil component 10 is not limited. For example, the top plate 12 can be omitted from the coil component 10. The shape of the first flange portion 20 is not limited to the shape of the above embodiment. For example, the end-surface-side protruding portion 23 can be omitted from the first flange portion 20.

In the above embodiment, the second wire 52 may be omitted from the coil component 10. For example, when the coil component 10 includes only the first wire 51, one metal terminal may be attached to each flange portion.

In the above embodiment, the winding core portion 11 may not have a quadrangular prism shape. For example, the sectional shape of the winding core portion 11 may be a circular shape, an elliptical shape, or a polygonal shape other than a quadrangular shape.

In the above embodiment, the shape of the first metal terminal 41 is not limited to the example of the above embodiment. The first metal terminal 41 may include the mounting portion 430, the connecting portion 420, and the bonding portion 410.

In the above embodiment, the bonding portion 410 may be bonded to a surface of the main body portion 21 other than the facing surface 22B. For example, the bonding portion 410 may be bonded to the inner end surface 21B of the main body portion 21.

In the above embodiment, the extending portion 440 may not be directly connected to the mounting portion 430. For example, the bonding portion 410 may be located between the extending portion 440 and the mounting portion 430.

In the above embodiment, the shortest distance W1 from the mounting portion 430 to the facing surface 22B may be smaller than or equal to the minimum dimension W2 of the mounting portion 430 in the direction along the first axis X.

In the above embodiment, the joining portion 450 may be separated from the bottom surface 21C. In addition, the adhesive 60 may be accommodated between the joining portion 450 and the bottom surface 21C.

In the above embodiment, the inclination angle of the first flat surface 22F is not limited to the example of the above embodiment. However, in order to obtain the effect described in (3), the inclination angle of the first flat surface 22F is preferably smaller than the average inclination angle of the first inclined surface 22C. The first flat surface 22F can be omitted from the first flange portion 20.

In the above embodiment, when the inclination angle of the first flat surface 22F is positive, the average inclination angle of the chamfered surface 22H may be smaller than the average inclination angle of the first flat surface 22F. In the first flange portion 20, the chamfered surface 22H can be omitted. When the chamfered surface 22H is omitted, the first flat surface 22F is adjacent to the outer end surface 22D. When the chamfered surface 22H and the first flat surface 22F are omitted, the first inclined surface 22C is adjacent to the outer end surface 22D.

In the above embodiment, the shortest distance W1 from the mounting portion 430 to the first flange portion 20 in the direction parallel to the first axis X may be smaller than the minimum dimension MS in the direction parallel to the central axis C from the end of the first inclined surface 22C in the inward direction to the outer end surface 21A.

In the above embodiment, the minimum dimension MS in the direction parallel to the central axis C from the end of the first inclined surface 22C in the inward direction to the bonding surface AS is not limited to the example of the above embodiment. On the other hand, in order to obtain the effect described in (7), the minimum dimension MS is preferably 100 μm or more. In order to secure the strength of the first flange portion 20, the minimum dimension MS is preferably 300 μm or less.

In the above embodiment, only one second inclined surface 22E may be provided in the first flange portion 20. In addition, the second inclined surface 22E can be omitted.

In the above embodiment, the inclination angle of the second flat surface 22G is not limited to the example of the above embodiment. However, in order to obtain the effect described in (9), the inclination angle of the second flat surface 22G is preferably smaller than the average inclination angle of the second inclined surface 22E. The second flat surface 22G can be omitted from the first flange portion 20. When the second flat surface 22G is omitted, the second inclined surface 22E is adjacent to the side end surface 22I. When the second inclined surface 22E is omitted together with the second flat surface 22G, the facing surface 22B is adjacent to the side end surface 22I.

In the above embodiment, the first inclined surface 22C and the second inclined surface 22E may not have a planar shape. For example, the first inclined surface 22C and the second inclined surface 22E may be curved surfaces. In addition, the first inclined surface 22C, the second inclined surface 22E, and the chamfered surface 22H may be subjected to barrel finishing or the like to be curved surfaces having non-uniform curvatures.

In the above embodiment, the recess 401 of the first metal terminal 41 can be omitted.

In the above embodiment, the extending portion 440 may be in contact with the bottom-surface-side protruding portion 22. The joining portion 450 may be in contact with the bottom-surface-side protruding portion 22.

In the above embodiment, the shape of the second portion 442 is not limited. For example, the surface of the second portion 442 facing the second positive direction Y1 side may be flush with the surface of the first portion 441 facing the second positive direction Y1 side. In this case, the surface of the second portion 442 facing the first flange portion 20 may have a shape recessed with respect to the surface of the first portion 441 facing the first flange portion 20. The second portion 442 may not have a surface that is flush with the first portion 441.

In the above embodiment, the position of the portion of the extending portion 440 that is smaller than the thickness dimension of the mounting portion 430, that is, the thin portion is not limited. For example, the thin portion may be located at the center of the extending portion 440 in the extending direction, or may be located at a connection portion of the extending portion 440 with the mounting portion 430.

In the above embodiment, the second portion 442 can be omitted in the extending portion 440. That is, the thickness dimension of the entire extending portion 440 may be the same as that of the mounting portion 430 or may be larger than that of the mounting portion 430.

In the above embodiment, the first portion 441 can be omitted in the extending portion 440. That is, the thickness dimension of the entire extending portion 440 may be smaller than the thickness dimension of the mounting portion 430.

In the above embodiment, the position of the joining protrusion 452 is not limited to the example of the above embodiment. For example, the geometric center G1 of the joining protrusion 452 may be located on the inward direction side with respect to the geometric center G2 of the joining portion 450. Further, the geometric center G1 of the joining protrusion 452 may be located on the side closer to the extending portion 440 with respect to the geometric center G2 of the joining portion 450. In addition, the geometric center G1 of the joining protrusion 452 may coincide with the geometric center G2 of the joining portion 450.

In the above embodiment, the shape of the joining protrusion 452 is not limited to the example of the above embodiment. For example, the joining protrusion 452 may have a substantially columnar shape.

In the above embodiment, the joining portion 450 may not include the joining protrusion 452.

In the above embodiment, the joining mode of the first wire end of the first wire 51 to the first metal terminal 41 is not limited to thermocompression bonding. For example, the first wire end may be joined to the first metal terminal 41 by laser welding or the like. The same applies to the second wire 52.

In the above embodiment, the boundary portion 23A between the end-surface-side protruding portion 23 and the outer end surface 21A of the main body portion 21 may not have a chamfered shape. That is, the boundary portion 23A may have a linear shape instead of a curved surface.

In the above embodiment, the chamfering dimension of the center-side end edge 402 may be the same as or smaller than the chamfering dimension of the boundary portion 23A.

In the above embodiment, the edge of the first metal terminal 41 on the second negative direction Y2 side and the side close to the first flange portion 20 may not be chamfered.

In the above embodiment, the bonding portion 410 and the end-surface-side protruding portion 23 may be in line contact instead of surface contact. Further, the bonding portion 410 and the end-surface-side protruding portion 23 may not be in contact with each other.

In the above embodiment, in the direction parallel to the first axis X, the portion located closest to the first positive direction X1 in the end-surface-side protruding portion 23 and the facing surface 22B may be at the same position.

In the above embodiment, the portion of the bonding portion 410 on the outermost direction side may be located on the inward direction side with respect to the portion of the end-surface-side protruding portion 23 on the outermost direction side. The portion of the bonding portion 410 on the outermost direction side and the portion of the end-surface-side protruding portion 23 on the outermost direction side may be located on the same plane.

Technical ideas that can be derived from the above embodiments and modifications will be described below.

[1] A coil component including: a drum core including a winding core portion having a columnar shape, a first flange portion connected to a first end in a direction parallel to a central axis of the winding core portion, and a second flange portion connected to a second end of the winding core portion on a side opposite to the first end; a first metal terminal attached to the first flange portion; and a wire wound around the winding core portion and having a first wire end joined to the first metal terminal. When a specific axis orthogonal to the central axis is defined as a first axis, and one of directions parallel to the first axis is defined as a first positive direction, the first flange portion projects outward with respect to the winding core portion in the first positive direction. The first metal terminal includes an adhesive portion that adheres to the first flange portion with a bonding interposed therebetween; a mounting portion located closest to the first positive direction side in the first metal terminal and separated from the first flange portion toward the first positive direction side; and a connecting portion connecting the bonding portion and the mounting portion. the first flange portion includes a facing surface facing the mounting portion and a bonding surface to which the bonding portion is bonded. The first flange portion has an inclined surface between the facing surface and the bonding surface, with the inclined surface having a larger distance from the facing surface in a direction parallel to the first axis toward the bonding surface.

[2] The coil component according to [1], in which, when a direction from the winding core portion toward the first flange portion in a direction parallel to the central axis is defined as an outward direction, the bonding portion is bonded to a surface of an outer surface of the first flange portion facing the outward direction.

[3] The coil component according to [1] or [2], in which the first flange portion has a flat surface having a planar shape between the bonding surface and the inclined surface, and an inclination angle of the flat surface with respect to the facing surface is smaller than an average inclination angle of the inclined surface with respect to the facing surface.

[4] The coil component according to [3], in which the first flange portion has a chamfered surface between the bonding surface and the flat surface, and an average inclination angle of the chamfered surface with respect to the facing surface is larger than an inclination angle of the flat surface with respect to the facing surface.

[5] The coil component according to any one of [1] to [4], in which a shortest distance from the mounting portion to the first flange portion in the direction parallel to the first axis is larger than a minimum dimension of the mounting portion in the direction parallel to the first axis.

[6] The coil component according to any one of [1] to [5], in which, when a direction from the first flange portion toward the winding core portion in the direction parallel to the central axis is defined as an inward direction, a shortest distance from the mounting portion to the first flange portion in the direction parallel to the first axis is larger than a minimum dimension in the direction parallel to the central axis from an end of the inclined surface in the inward direction to the bonding surface.

[7] The coil component according to any one of [1] to [6], in which, when a direction from the first flange portion toward the winding core portion in the direction parallel to the central axis is defined as an inward direction, a minimum dimension in the direction parallel to the central axis from an end of the inclined surface in the inward direction to the bonding surface is 100 μm or more and 300 μm or less (i.e., from 100 μm to 300 μm).

[8] The coil component according to any one of [1] to [7], in which, when the inclined surface is a first inclined surface, the first flange portion includes a second inclined surface adjacent to the facing surface and the first inclined surface, and the second inclined surface is inclined such that a distance from the facing surface increases in the direction parallel to the first axis as a distance from the facing surface increases.

[9] The coil component according to [8], in which the first flange portion has a second flat surface having a planar shape adjacent to the second inclined surface on a side opposite to the facing surface, and in which an inclination angle of the second flat surface with respect to the facing surface is smaller than an average inclination angle of the second inclined surface with respect to the facing surface.

What is claimed is:

1. A coil component comprising:

a drum core including a winding core portion having a columnar shape, a first flange portion connected to a first end in a direction parallel to a central axis of the winding core portion, and a second flange portion connected to a second end of the winding core portion on a side opposite to the first end;

a first metal terminal attached to the first flange portion; and a wire wound around the winding core portion and having a first wire end joined to the first metal terminal, assuming that a specific axis orthogonal to the central axis is defined as a first axis, and one of directions parallel to the first axis is defined as a first positive direction, the first flange portion projects outward with respect to the winding core portion in the first positive direction, the first metal terminal includes:

a bonding portion that adheres to the first flange portion with an adhesive interposed therebetween;

a mounting portion located outermost on a side of the first positive direction in the first metal terminal and separated from the first flange portion toward the side of the first positive direction; and a connecting portion connecting the bonding portion and the mounting portion, and the first flange portion includes a facing surface facing the mounting portion and a bonding surface to which the bonding portion is bonded, and the first flange portion has an inclined surface between the facing surface and the bonding surface, the inclined surface is inclined such that a distance from the facing surface in a direction parallel to the first axis increases toward the bonding surface.

2. The coil component according to claim 1, wherein when a direction from the winding core portion toward the first flange portion in a direction parallel to the central axis is defined as an outward direction, the bonding portion is bonded to a surface facing the outward direction among outer surfaces of the first flange portion.

3. The coil component according to claim 1, wherein the first flange portion has a flat surface having a planar shape between the bonding surface and the inclined surface, and an inclination angle of the flat surface with respect to the facing surface is smaller than an average inclination angle of the inclined surface with respect to the facing surface.

4. The coil component according to claim 3, wherein the first flange portion has a chamfered surface between the bonding surface and the flat surface, and an average inclination angle of the chamfered surface with respect to the facing surface is larger than an inclination angle of the flat surface with respect to the facing surface.

5. The coil component according to claim 1, wherein a shortest distance from the mounting portion to the first flange portion in the direction parallel to the first axis is larger than a minimum dimension of the mounting portion in the direction parallel to the first axis.

6. The coil component according to claim 1, wherein when a direction from the first flange portion toward the winding core portion in the direction parallel to the central axis is defined as an inward direction, a shortest distance from the mounting portion to the first flange portion in the direction parallel to the first axis is larger than a minimum dimension in the direction parallel to the central axis from an end of the inclined surface in the inward direction to the bonding surface.

7. The coil component according to claim 1, wherein when a direction from the first flange portion toward the winding core portion in the direction parallel to the central axis is defined as an inward direction, a minimum dimension in the direction parallel to the central axis from an end of the inclined surface in the inward direction to the bonding surface is from 100 μm to 300 μm.

8. The coil component according to claim 1, wherein when the inclined surface is defined as a first inclined surface, the first flange portion includes a second inclined surface adjacent to the facing surface and the first inclined surface, and the second inclined surface is inclined such that a distance from the facing surface in the direction parallel to the first axis increases as the second inclined surface is away from the facing surface.

9. The coil component according to claim 8, wherein the first flange portion has a second flat surface having a planar shape adjacent to the second inclined surface on a side opposite to the facing surface, and an inclination angle of the second flat surface with respect to the facing surface is smaller than an average inclination angle of the second inclined surface with respect to the facing surface.

* * * * *